US009585116B2

(12) United States Patent
Glass et al.

(10) Patent No.: US 9,585,116 B2
(45) Date of Patent: *Feb. 28, 2017

(54) DUAL MODE SERVICE WIFI ACCESS CONTROL

(71) Applicant: AT&T Mobility II LLC, Atlanta, GA (US)

(72) Inventors: David Glass, Redmond, WA (US); Adnan Abu-Dayya, Doha (QA)

(73) Assignee: AT&T MOBILITY II LLC, Atlanta, GA (US)

(*) Notice: Subject to any disclaimer, the term of this patent is extended or adjusted under 35 U.S.C. 154(b) by 73 days.

This patent is subject to a terminal disclaimer.

(21) Appl. No.: 14/568,876

(22) Filed: Dec. 12, 2014

(65) Prior Publication Data
US 2015/0099487 A1 Apr. 9, 2015

Related U.S. Application Data

(63) Continuation of application No. 13/684,956, filed on Nov. 26, 2012, now Pat. No. 8,954,069, which is a
(Continued)

(51) Int. Cl.
*H04W 60/00* (2009.01)
*H04W 4/22* (2009.01)
(Continued)

(52) U.S. Cl.
CPC ......... *H04W 60/005* (2013.01); *H04L 67/306* (2013.01); *H04L 67/32* (2013.01);
(Continued)

(58) Field of Classification Search
CPC .................................................. H04W 60/005
See application file for complete search history.

(56) References Cited

U.S. PATENT DOCUMENTS 7,245,900 B1 7/2007 Lamb et al.
7,433,673 B1 10/2008 Everson et al.
(Continued)

FOREIGN PATENT DOCUMENTS

JP 10511241 6/1996
JP 2006100970 4/2006
(Continued)

OTHER PUBLICATIONS

International Search Report and Written Opinion dated Mar. 19, 2008 for PCT Application Serial No. PCT|US07/18384, 10 Pages.
(Continued)

*Primary Examiner* — Mazda Sabouri
(74) *Attorney, Agent, or Firm* — Amin, Turocy & Watson, LLP

(57) ABSTRACT

The provision of dual mode services is facilitated. Access to the dual mode services is controlled by associating a mobile device to an access point. Subscribers are required to provide valid geographical addresses for access points associated with the mobile devices prior to provision of service. Consequently, physical addresses are necessarily available for emergency services (e.g., E911). Mobile devices are restricted to specific access points based upon the access point identifiers automatically provided during initialization of service and maintained for authorization purposes.

20 Claims, 13 Drawing Sheets

Related U.S. Application Data continuation of application No. 11/465,728, filed on Aug. 18, 2006, now Pat. No. 8,340,711.

(51) Int. Cl.
| | |
|---|---|
| *H04W 12/08* | (2009.01) |
| *H04W 76/00* | (2009.01) |
| *H04L 29/08* | (2006.01) |
| *H04W 88/06* | (2009.01) |
| *H04W 8/18* | (2009.01) |
| *H04W 8/26* | (2009.01) |
| *H04W 64/00* | (2009.01) |
| *H04W 88/08* | (2009.01) |

(52) U.S. Cl.
CPC ............ *H04W 4/22* (2013.01); *H04W 12/08* (2013.01); *H04W 76/007* (2013.01); *H04W 88/06* (2013.01); *H04W 8/18* (2013.01); *H04W 8/26* (2013.01); *H04W 64/00* (2013.01); *H04W 88/08* (2013.01)

(56) References Cited

U.S. PATENT DOCUMENTS

| | | | |
|---|---|---|---|
| 7,636,338 B1 * | 12/2009 | Vu | H04L 63/08 370/338 |
| 7,805,161 B1 | 9/2010 | Jones | |
| 8,131,209 B1 * | 3/2012 | Chen | H04B 7/15528 370/315 |
| 2003/0222819 A1 | 12/2003 | Karr et al. | |
| 2004/0111405 A1 | 6/2004 | Wieczorek et al. | |
| 2004/0177133 A1 | 9/2004 | Harrison et al. | |
| 2005/0086535 A1 | 4/2005 | Ernst et al. | |
| 2005/0181805 A1 | 8/2005 | Gallagher | |
| 2005/0186948 A1 | 8/2005 | Gallagher et al. | |
| 2005/0249171 A1 | 11/2005 | Buckley et al. | |
| 2005/0260973 A1 | 11/2005 | van de Groenendaal | |
| 2006/0063560 A1 | 3/2006 | Herle | |
| 2006/0099935 A1 | 5/2006 | Gallagher et al. | |
| 2006/0105776 A1 | 5/2006 | Burke | |
| 2006/0209773 A1 | 9/2006 | Hundal et al. | |
| 2006/0286980 A1 | 12/2006 | Hua | |
| 2007/0008885 A1 | 1/2007 | Bonner | |
| 2007/0049293 A1 | 3/2007 | Russell | |
| 2007/0091861 A1 | 4/2007 | Gupta et al. | |
| 2007/0149243 A1 | 6/2007 | Hwang et al. | |
| 2007/0153982 A1 | 7/2007 | Bloebaum et al. | |
| 2007/0165802 A1 | 7/2007 | Fox | |
| 2007/0213071 A1 | 9/2007 | Hwang | |
| 2007/0249323 A1 | 10/2007 | Lee et al. | |
| 2007/0256135 A1 | 11/2007 | Doradla et al. | |
| 2007/0268908 A1 | 11/2007 | Linkola et al. | |

FOREIGN PATENT DOCUMENTS

| | | |
|---|---|---|
| WO | 2005114918 | 12/2005 |
| WO | 2006058553 | 6/2006 |

OTHER PUBLICATIONS

Office Action dated Sep. 25, 2009 for U.S. Appl. No. 11/465,728, 26 pages.
Office Action dated Apr. 22, 2010 for U.S. Appl. No. 11/465,728, 26 pages.
European Office Action for European Patent Application No. 07837064.0. dated Sep. 28, 2010.
Supplemental European Search Report for European Patent Application No. 07837064.0, dated Sep. 9, 2010.
CA OA dated Mar. 14, 2011 for Canadian Patent Application No. 2,654,897, 3 pages.
Office Action dated Feb. 29, 2012 for U.S. Appl. No. 11/465,728, 25 pages.
Notice of Allowance dated Aug. 16, 2012 for U.S. Appl. No. 11/465,728, 14 pages.
EP Office Action dated May 31, 2012 for European Patent Application No. 07 837 064.0-2412, 8 pages.
Japanese Office Action dated Feb. 27, 2012 for Japanese Patent Application No. 2009-52470, 6 pages.
Japanese Office Action dated Oct. 30, 2012 for Japanese Patent Application No. 2009-52470, 11 pages.
Japanese Office Action mailed Feb. 7, 2013 for Japanese Patent Application No. 2009-524701, 8 pages.
European Office Action for European Patent Application No. 07837064.0. dated Apr. 11, 2013, 2 pages.
European Office Action for European Patent Application No. 07837064.0. dated Jul. 29, 2014, 2 pages.
Japanese Office Action mailed Sep. 3, 2013 for Japanese Patent Application No. 2009-524701, 6 pages.
Final Office Action dated May 13, 2014 for U.S. Appl. No. 13/684,956, 30 pages.
Non-final Office Action date Oct. 30, 2013 for U.S. Appl. No. 13/684,956, 29 pages.

* cited by examiner

DUAL MODE SERVICE WIFI ACCESS CONTROL

CROSS-REFERENCE TO RELATED APPLICATIONS

This patent application is a continuation of, and claims priority to each of, U.S. patent application. Ser. No. 13/684,956 (now U.S. Pat. No. 8,954,069), filed Nov. 26, 2012, and entitled, "DUAL MODE SERVICE WIFI ACCESS CONTROL," which is a continuation of U.S. patent application Ser. No. 11/465,728 (now U.S. Pat. No. 8,340,711), filed Aug. 18, 2006, and entitled, "DUAL MODE SERVICE WIFI ACCESS CONTROL," the entireties of each of which applications are incorporated herein by reference.

BACKGROUND

The mobile telephone industry has been associated with tremendous growth over the last several years. For instance, in the recent past, mobile telephones were costly, bulky and awkward to transport. Moreover, network coverage was not extensive enough to enable robust service. Only areas associated with dense population were provided with extensive wireless network coverage. In contrast, today's mobile phones (and other portable devices) have decreased in both size and cost and can be utilized as full-service computing machines. For example, many of the most recent and advanced mobile phones can be associated with word processing software, accounting software, and various other types of software. Network coverage has expanded to cover millions, if not billions, of users.

Advances in technology relating to mobile devices in general, and mobile phones in particular, continue to occur. For example, recently mobile telephones have been designed to communicate over disparate networks. For example, a dual mode handset can connect to a cellular network to effectuate communications between a user of the mobile phone and another phone device, and can further connect via WiFi to a wireless local access network (LAN) and thereafter utilize the Voice over Internet Protocol (VoIP) to effectuate communication between users. Use of VoIP is often desirable to users as it is associated with lower costs than employing a cellular network. In fact, some users may consider phone calls made over VoIP (or other IP-based network) completely free, despite the fact that they pay for Internet service.

Implementation of this dual mode service (DMS) is due at least in part to the Third Generation Partnership Project (3GPP), which have created specifications that define a mechanism that provides signal integrity for session initial protocol (SIP) signals between an IP multimedia subsystem (IMS) (P-SCCF) and user equipment (UE) (e.g., a mobile phone, a personal digital assistant, . . . ). This integrity prevents identity spoofing, man-in-the-middle attacks, and the like. The IMS represents a 3GPP and 3GPP2 effort to define an all-IP-based wireless network as a replacement for the various voice, data, signaling, and control network elements currently in existence. Furthermore, the IMS enables support for IP multimedia applications within the Universal Mobile Telecommunications System (UMTS). The UMTS is a 3G broadband packet-based transmission of text, digitized voice, video, and multimedia that offers a consistent set of services to mobile computer and phone users regardless of their physical location.

The telecom industry is currently shifting towards all IP-systems, thereby rendering dual mode service handsets an important tool (as they are compatible with existing cellular systems and emerging IP-systems). This shift is driven by desires to reduce costs and create new streams of revenue while protecting an operator business model. IMS is a new service domain that facilitates this shift by enabling convergence of data, speech, and network technology over an IP-based infrastructure. For users, IMS-based services enable transmittal and receipt of various data at significantly reduced cost, including voice, text, pictures, video, and/or any combination thereof in a highly personalized and secure manner. In summary, IMS is designed to bridge the gap between existing, traditional telecommunications technology and Internet technology that increased bandwidth does not provide.

As stated above, these emerging IP-based technologies have created demand for dual mode services, and thus for dual mode handsets. Using this technology, subscribers can employ WiFi to effectuate voice calls, transmission of data, and the like. In more detail, a subscriber can connect to a LAN by way of WiFi. Upon such connection, subscribers can employ services offered by their service provider.

As VoIP systems and dual mode handsets have become more accepted and prevalent, these systems have been required to provide the same capabilities as traditional telephone networks, including emergency services. During an emergency situation, a user can be flustered or injured and unable to provide accurate location information, whether due to age, infirmity, injury or ignorance. Typically, traditional fixed line telephone networks can connect a caller to local emergency services and automatically provide location information to the emergency service center. In the past, VoIP systems have not reliably provided location information or even connection to emergency services such as Enhanced 911 (E911). However, government regulations adopted by the Federal Communications Commission (FCC) now require VoIP providers to supply E911 service capabilities to their subscribers.

DETAILED DESCRIPTION

Figure 1:
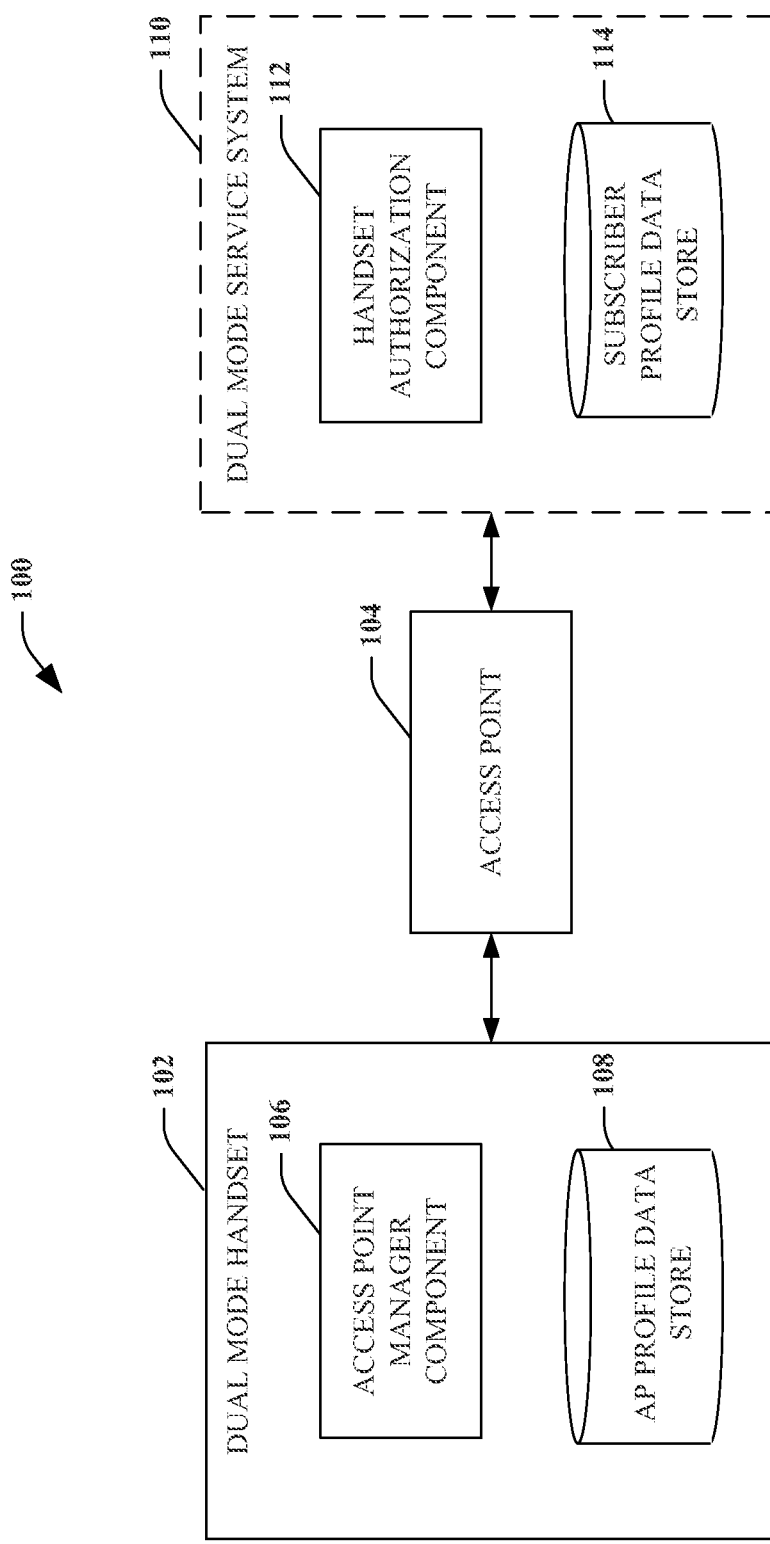
FIG. 1 is a high-level block diagram of a system that facilitates provisioning of dual mode service.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computing device, such as a mobile handset, to implement the disclosed subject matter. The term "article of manufacture" as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

This disclosure relates generally to dual mode services, and more particularly to provision of dual mode services utilizing limited access points, where access can be controlled utilizing automatically provided access point identifiers. To support emergency services, the dual mode handset allows the subscriber to connect to a local emergency service center such as a Public Safety Answering Point (PSAP). The dual mode handset automatically provides the emergency service center with a physical or geographical address associated with the dual mode handset. These E911 requirements can be met by limiting the access points that dual mode handsets can utilize and by requiring subscribers to provide an associated physical address for emergency service purposes.

The systems and methods described herein require a subscriber to provide a valid physical address prior to provision of dual mode service for a subscriber account. The physical address can be provided during dual mode service activation and can be validated based upon availability of emergency services for the address location. A dual mode handset associated with the subscriber account can be restricted to a subscriber selected access point. For example, a subscriber can provide their home address during activation and then limit dual mode service for their handset to an access point located at their house. Consequently, when the handset accesses dual mode services, it necessarily connects through the access point located at the subscriber's house. If needed, the subscriber's home address is available to be automatically provided to E911 by the dual mode service provider.

During an initialization process, a subscriber selects a particular access point for dual mode service. An access point identifier (e.g., MAC-ID) for the selected access point can be automatically captured and provided directly to the dual mode service provider. The service provider can utilize this provided access point identifier to limit the handset by denying service if connection is attempted through an alternative access point. In addition, once initialized, the handset can retain information for the selected access point and can attempt to connect only through the selected access point.

To increase accuracy and usability, the access point identifier can be automatically captured by the handset. Direct transmission of the access point identifier from the access point to the handset reduces the possibility of error. In particular, the possibility of transcription errors by the subscriber is mitigated. In addition, subscribers may have difficulty in locating the access point identifier. Automatic capture reduces the effort for subscribers during initialization process.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other aspects and novel features will become apparent from the following detailed description when considered in conjunction with the drawings.

Turning now to the drawings, FIG. 1 illustrates a system 100 that facilitates provision of E911 service with respect to dual mode handsets. The system 100 ensures that the required address information is available for E911 by restricting dual-mode handsets to specified access points and requiring users to provide valid physical addresses prior to provision of service. Unique access point identifiers are used to control access to dual mode services. The system can include one or more dual mode handsets 102. Here, a dual mode handset 102 can include any mobile device that utilizes a cellular network and that can connect via a WiFi access point to a wireless local access network (LAN) and thereafter utilize the Voice over Internet Protocol (VoIP) to effectuate communications between a user of the mobile device and another mobile device. Any number of dual mode handsets can be provisioned with service. In particular, the dual mode handset can connect to a LAN to utilize VoIP through a wireless access point 104.

During an initialization process discussed in detail with respect to FIGS. 3 and 7 below, the dual mode handset 102 can be related or paired with a specific access point 104 and restricted to connections using VoIP through the specified or related access point 104. An access point manager component 106 can monitor access point broadcasts and connect when it detects the related access point. The handset 102 can include an access point or (AP) profile data store 108 that maintains an access point profile including information regarding the access point with which the handset has been related or paired. The information can include an access point identifier, also referred to herein as an AP-ID. The access point identifier is a unique code by which a particular access point can be distinguished, such as the Media Access Controller Identifier (MAC-ID). To ensure accuracy, the handset 102 can automatically obtain the access point identifier directly from the selected access point 104.

Retrieval of the access point identifier directly from the access point, without intervention by a subscriber can increase the accuracy as well as enhancing system usability. For example, the MAC-ID can be buried within the documentation provided with the access point or possibly attached to the device itself (e.g., imprinted on the bottom of the device). Searching through user's guide for a single code or locating a number imprinted on the bottom of the device can be frustrating for subscribers. Accordingly, automatic provision of the MAC-ID reduces the effort required of subscribers during initialization. In addition, automatic provision of an access point identifier, such as the MAC-ID, can increase accuracy. It is particularly easy to mistype long codes because they do not have well-known spellings or easily discernible patterns. When the handset 102 retrieves the access point identifier directly from the access point 104, one possible source of error is removed.

The access point profile maintained in the AP profile data store 108 can also include a Service Set Identifier (SSID). Access points 104 typically broadcast an SSID to alert devices to possible services and to identify the access point 104. The access point manager component 106 can utilize the SSID or other access point information to identify the particular access point 104 with which it is related and to limit connections to the related access point.

The dual mode handset 102 can connect through the access point 104 to a dual mode service system 110. Upon request for service from a handset 102, a handset authorization component 112 can retrieve a subscriber profile from a subscriber profile data store 114, based upon the subscriber account associated with the handset 102. The subscriber profile can be used to verify that the subscriber has activated the dual mode service feature. The subscriber profile associated with the subscriber account can include an indicator that signifies whether the subscriber has elected dual mode service as well as a home access point identifier that specifies the access point with which the handset is related or paired. The handset authorization component 112 can compare the access point identifier for the access point from which the handset is currently requesting service and the home access point identifier maintained in the subscriber profile data store 114. Authorization of service for the handset 102 can be based at least in part upon the comparison. The subscriber profile can also include physical or geographical information for the subscriber account and thereby associated with the home access point identifier. By ensuring that the handset is connecting through the predefined home access point, the dual mode service system 110 can ensure that the physical address can be provided for E911 services.

In an IMS network, a Home Subscriber Server (HSS) can act as the subscriber profile data store 114, maintaining the requisite subscription-related information. The handset authorization component 112 can be implemented as an authentication and authorization (AAA) server, that verifies both the subscriber profile and the access point identifier before allowing the establishment of a secure IP security (IPsec) tunnel between the handset 102 and the IMS network core.

Figure 2:
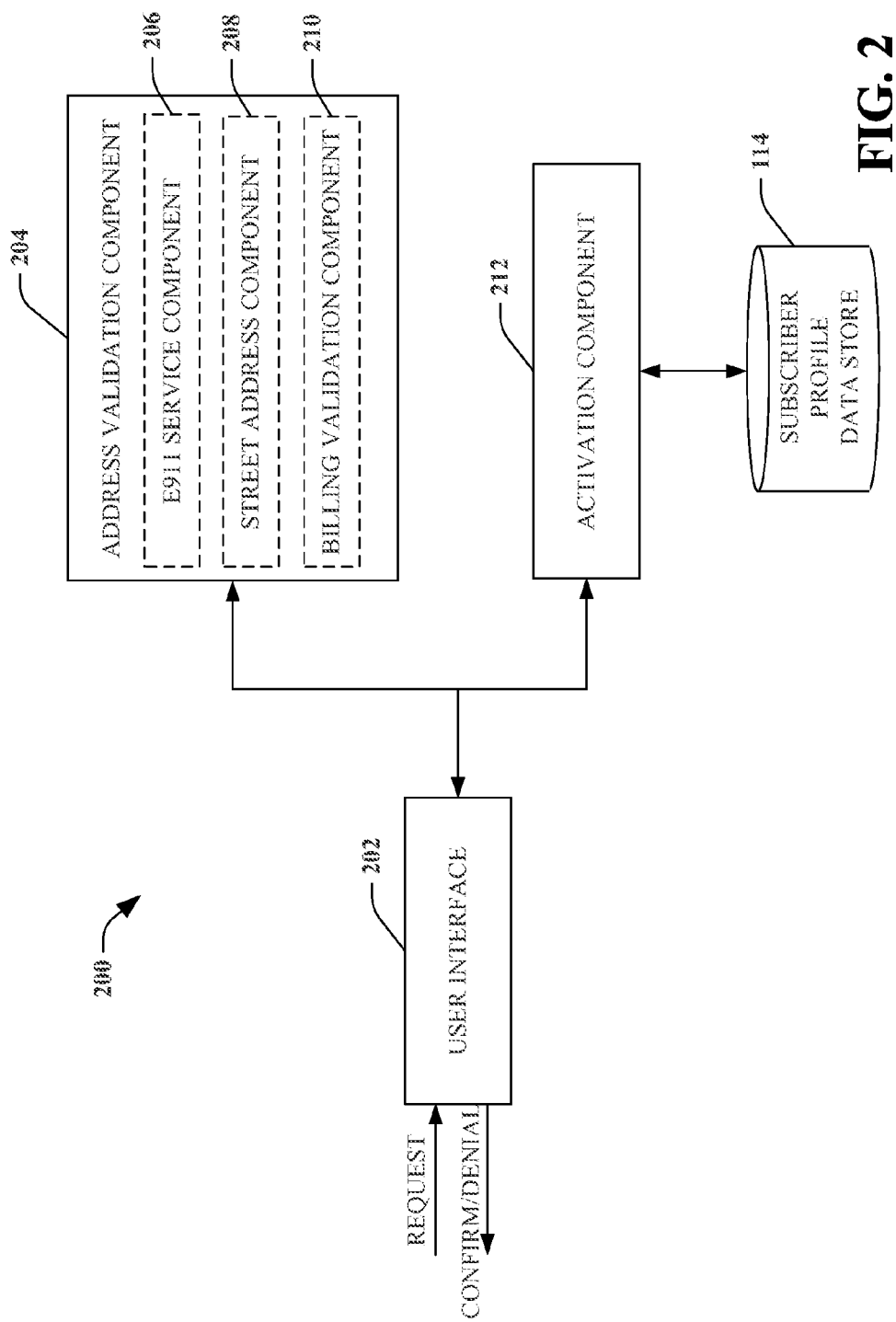
FIG. 2 is a block diagram of a system for facilitating activation of dual mode service for a subscriber account.

Referring now to FIG. 2, a system 200 for facilitating subscription to or activation of dual mode services is illustrated. The system includes a user interface 202 that receives requests for dual mode service from subscribers or potential subscribers. The user interface 202 can include any form or type of interface that allows a subscriber to communicate a desire to elect dual mode services including, but not limited to, a web page, an automated phone system or a human representative. The user interface 202 can be capable of communicating with the subscriber, receiving the subscription request and actuating the subscription process.

During the subscription or activation process, the user interface 202 can obtain a geographical address associated for E911 services. The geographical address can be provided in any format from which a location can be determined (e.g., a street address or latitude and longitude). The geographical address can be input by the subscriber (e.g., via a keyboard, a tablet, speech recognition software and the like). Additionally, or alternatively, a geographical address can be automatically determined based upon information regarding the subscriber's current location (as determined via GPS, radio location or any other positioning method) or based upon the subscriber's current information (e.g., billing records). The geographical address can be provided to the subscriber by the user interface 202 for confirmation to ensure accuracy.

An address validation component 204 can evaluate the obtained geographical address and analyze whether the address is valid and usable for emergency service purposes. An E911 service component 206 can evaluate whether the received address is within an area that has E911 coverage. The address can be geocoded and a determination can be made as to whether there is a Public Safety Answering Point (PSAP) within range of that location. A street address component 208 can determine whether the obtained physical address is valid using a Master Street Address Guide (MSAG) for the appropriate city or region. The obtained physical address can also be compared to billing information for the subscriber to assist in address validation. A billing validation component 210 can cross check the obtained physical address with a billing address associated with the subscriber. If the physical address differs from the billing address, the user interface 202 can query the subscriber and confirm a separate address for E911 services.

An activation component 212 can activate dual mode services for a subscriber. The activation component 212 can update or create a subscriber profile maintained in the subscriber profile data store 114 to indicate that the subscriber has elected dual mode service. The subscriber profile can include the obtained physical address and an indicator that dual mode service has been elected. In addition, the subscriber profile can include the home access point identifier, which can be set to a default value by the activation component 212 during the subscription process.

Figure 3:
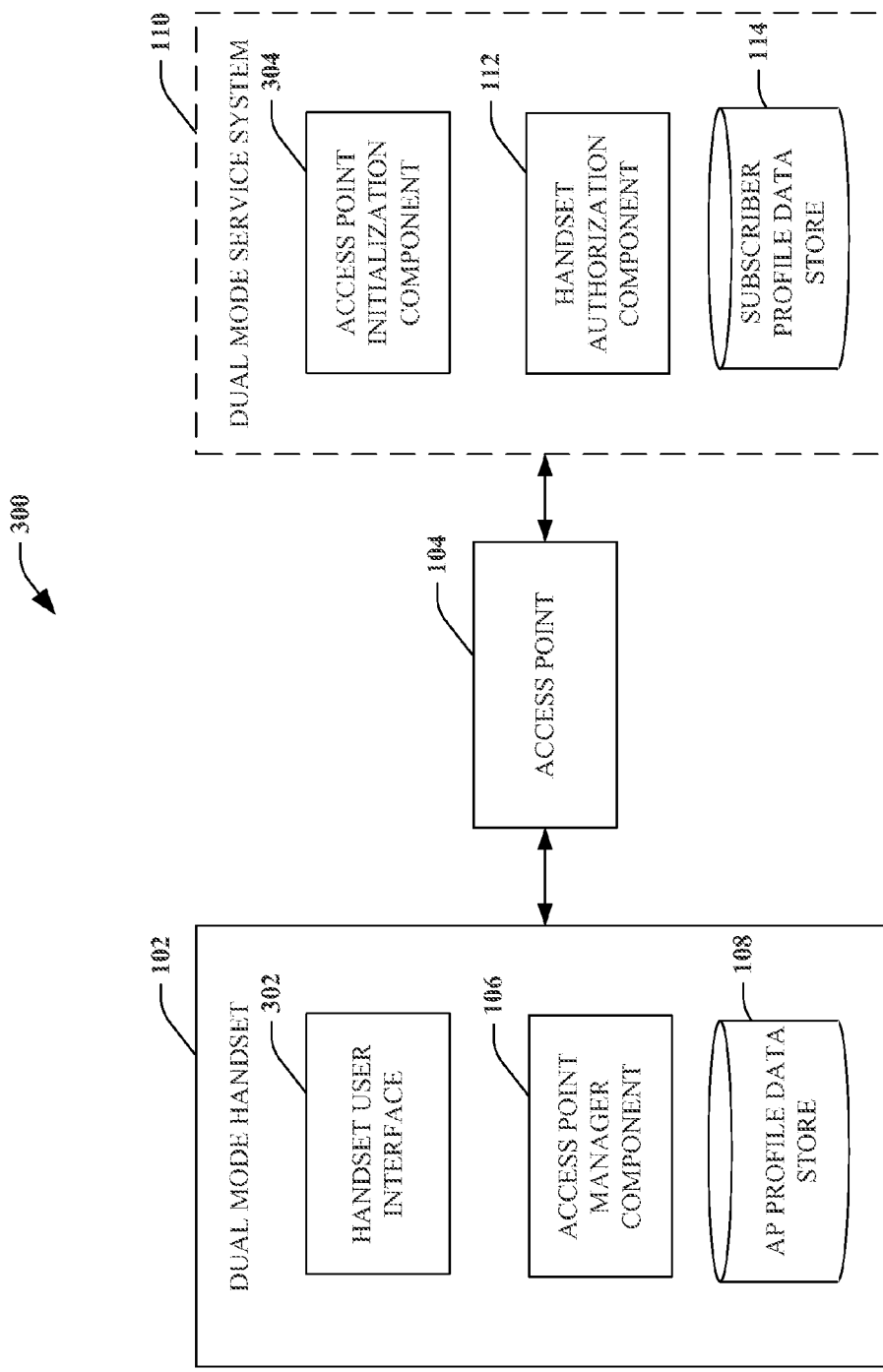
FIG. 3 is a block diagram of a system for facilitating initialization of dual mode service for a subscriber account.
Figure 4:
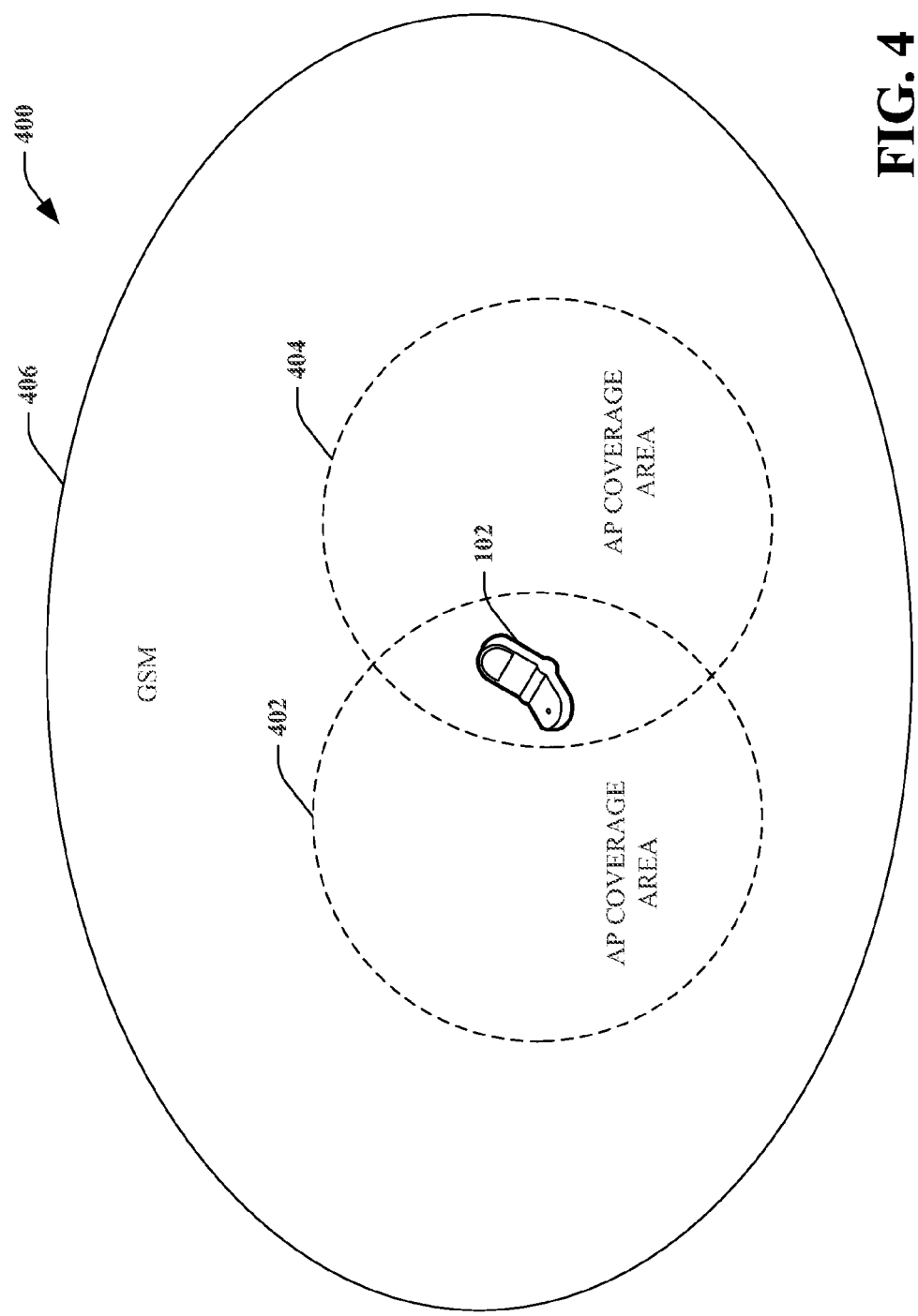
FIG. 4 is a representative diagram illustrating a wireless environment wherein dual mode service is provided.

Referring now to FIGS. 3 and 4, in FIG. 3 a system 300 for initializing dual mode service is illustrated while FIG. 4 illustrates an operating environment for a dual mode service handset. As illustrated in FIG. 3, during initialization a dual mode handset 102 can be related to a particular access point 104, such that VoIP service for the handset 102 is limited to the related access point 104. The dual mode handset can include a handset user interface 302 that allows a subscriber to begin the initialization process. The handset user interface 302 can provide the subscriber with a list of detected access points 104 and prompt the subscriber to select an access point. For example, the list can display the SSIDs for available access points. During the process of relating a handset 102 to an access point 104, the access point identifier for the selected access point 104 can be obtained by the access point manager component 106 of the handset 102. The access point manager component 106 can form an access point initialization message for transmission to the dual mode service system 110 via the access point 104. For example, the access point manager component 106 can form an Unstructured Support Services Data (USSD) message. USSD messages are well known and useful for a number of services and can be modified to include the access point identifier for this scenario.

The handset 102 can establish communications to the dual mode service provider 110 via the access point 104. Initially the handset 102 can establish a link (e.g., an IEEE 802.11 link) to the access point 104. Once the handset 102 has established the link to the access point 104, the handset 102 can initiate Internet Key Exchange (IKE) authentication in preparation for establishing a secure tunnel to the dual mode service system 110. Upon initiation of IKE authentication, the handset authorization component 112 can access the subscriber profile data store 114 to retrieve the subscriber profile and determine if the subscriber has dual mode service and if either the access point identifier provided by the handset 102 matches the home access point identifier maintained in the subscriber profile or if the home access point identifier is set to a default value.

If the subscriber has not subscribed to dual mode service, the handset authorization component 112 will deny service to the handset 102. In addition, if the current access point 104 is not the access point with which the handset 102 has been related and if the home access point identifier is not set to the default value, the handset authorization component 112 will deny service to the handset 102. A default value in the home access point identifier would indicate that dual mode service had been activated, but not initialized to a specific access point. Accordingly, if the home access point identifier is equal to the default value, the initialization process continues.

The handset authorization component 112 can also determine whether the subscriber has valid wireless service as a precondition of service. The handset authorization component 112 (e.g., an AAA server) can query the Home Location Register (HLR) of the Global System for Mobile Communications (GSM) for the mobile service provider to return EAP-SIM (Extensible Authentication Protocol for Subscriber Identity Module) authentication information. The handset authorization component 112 can deny service if the subscriber does not have valid mobile service.

Once the dual mode handset 102 is registered and a secure tunnel with the dual mode service system 110 has been established, the handset 102 can automatically transmit the access point initialization message, thereby selecting the particular access point 104 for communication. An access point initialization component 304 can utilize the access point identifier within the access point initialization message to update the subscriber profile maintained in the subscriber profile data store 114.

In particular, if the access point initialization message is implemented as a USSD message, the message can be received by the HLR over the secure link and forwarded to a USSD server. The USSD server can be programmed to format the access point authorization message and update any billing system records with the access point identifier. A switch control process can provide the access point identifier to the subscriber profile data store 114 (e.g., HSS) and replace the default value therein. The subscriber profile data store 114 can transmit an acknowledgement to the USSD server, which in turn can transmit an acknowledgement to the handset 102, indicating that the access point identifier was successfully initialized.

Now referring to FIG. 4, a representative diagram 400 illustrating an operating environment for a dual mode handset 102 is provided. Here, a dual mode handset 102 is currently located within coverage areas 402 and 404 for two different access points. Given the growing prevalence of wireless access points, frequently a handset 102 will be within coverage areas for multiple access points. While only two are shown here for simplicity, multiple access point coverage areas can overlap. The subscriber can select one of the available access points.

Access point coverage areas 402 and 404 can be located within a much larger GSM coverage area 406. Once dual mode service is initialized the subscriber may wish to automatically switch to VoIP service upon entering the selected access point coverage area 402 or 404 to avoid possible fees for cellular service. Accordingly, the handset 102 can monitor the broadcast messages of access points to determine when the handset 102 enters the coverage area of the selected access point.

Figure 5:
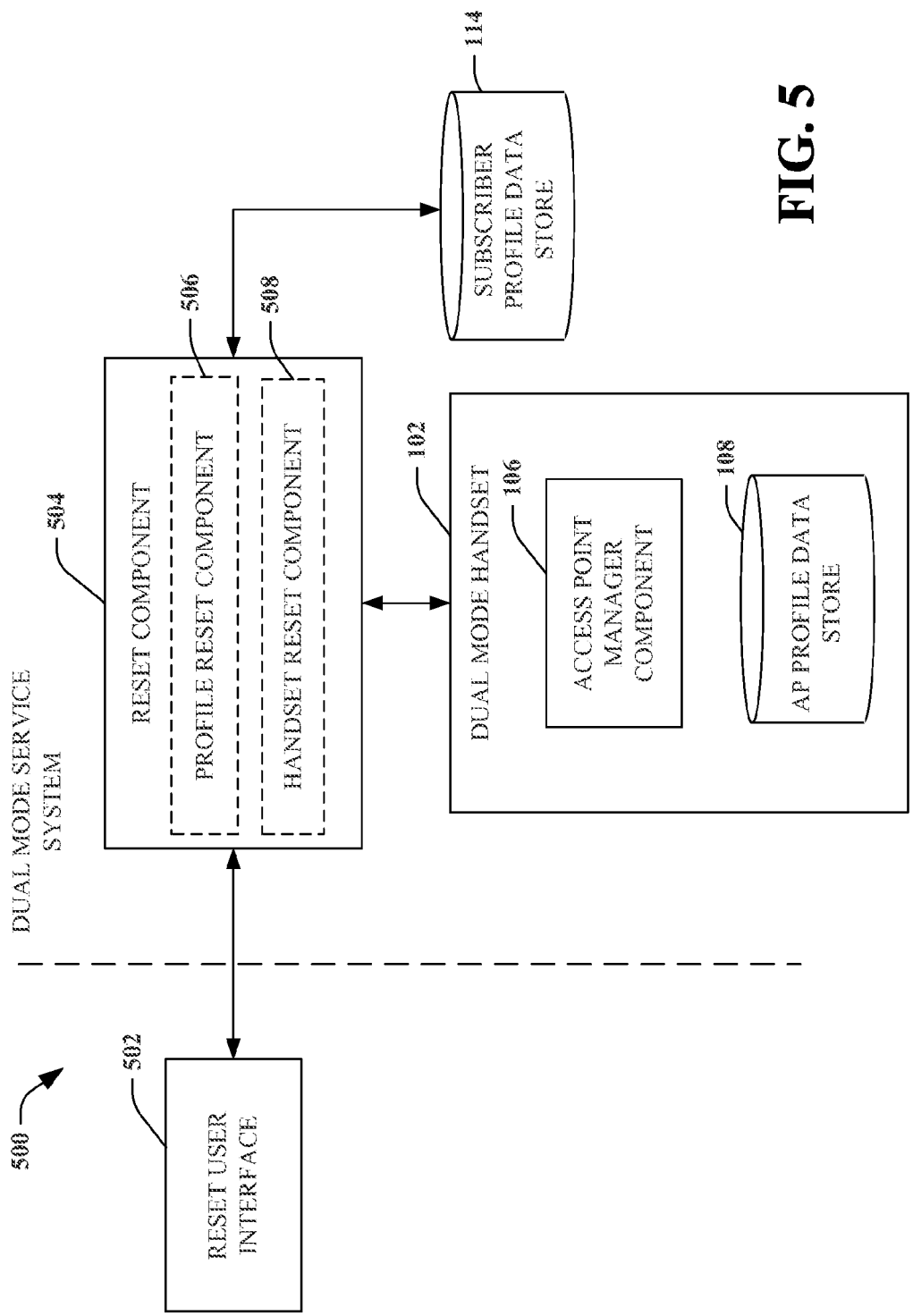
FIG. 5 is a block diagram of a system for resetting an access point associated with a subscriber account.

Referring now to FIG. 5, a system 500 for resetting the selected dual mode service access point is illustrated. The selected access point for a handset can be reset in preparation for updating the access point. For example, the subscriber can purchase a new access point and switch service to the newly acquired access point. Before the handset 102 can be utilized with a new access point, the access point for dual mode service should be reset or reinitialized. In addition, if the subscriber has discontinued dual mode service, the system 500 can provide for cessation of dual mode service.

The system 500 can include a reset user interface 502 that receives a request from a subscriber to reset the access point related to a dual mode handset, or to discontinue dual mode service. The reset user interface 502 can include any form or type of interface that allows a subscriber to communicate a desire to reset or discontinue dual mode services including, but not limited to, a web page, an automated phone system or a human representative. The reset user interface 502 obtains information including a subscriber identifier (e.g., MSISDN), verifies the identity of the subscriber and requests a reset of the related access point. Alternatively, the request to reset the access point for a handset can be generated automatically. For example, if a subscriber fails to pay fees associated with dual mode service, a reset request can be generated by the billing system and service can be discontinued.

A reset component 504 can respond to a request to reset the access point or delete the dual mode service for the subscriber. The reset component 504 can include a profile reset component 506 that obtains the subscriber profile from the subscriber profile data store 114 and resets the home access point identifier to the default value. In addition, if dual mode service has been cancelled, the reset component 504 can modify the subscriber profile to indicate that the subscriber does not receive dual mode service. The reset component 504 can also include a handset reset component 508 that generates a reset or cancellation for the dual mode handset 102. Upon receiving a reset or cancellation message, the access point manager component 106 can reset or clear the access point profile stored in the AP profile data store 108. When the access point profile is cleared, the handset need no longer monitor access point broadcast messages.

Requests for a reset of the selected access point can indicate a change in the subscriber's circumstances. In addition to updating access point information, the subscriber can be prompted to confirm the existing physical address or enter a new physical address. The subscriber can be prompted through a separate reset user interface 502 or via the handset.

The systems herein have been described as limiting a handset to a single access point associated with a single physical address. Alternatively, the systems can be adapted to provide for a limited number of physical addresses and associated access points. In order to provide location information for emergency services, it is critical that each access point is associated with a single physical address. However, it is possible to adapt the systems to provide for a limited number of physical addresses each associated with a specific access point. During activation, the system can provide for the entry of a limited set of physical addresses associated with the subscriber account (e.g., subscriber's home, vacation house and office). Each physical address can have a separate, associated home access point identifier. If any of the physical addresses are validated, the subscriber profile can be updated and dual mode services can be activated. The home access point identifier for each valid address can be set to a default value. The home access point identifier for any invalid addresses or where addresses have not been provided can be set to an invalid default value.

During initialization, a particular physical address can be associated with a specific access point. As described above with respect to single address systems, the subscriber can begin the initiation process, select an access point from a list of available access points and initiate a connection to the dual mode service system. Here, the analysis performed by the handset authorization component varies from that described above in the single physical address systems. In the present case, if the current access point identifier matches any of the home access point identifiers, service is provided and the physical address associated with the matching home access point identifier is noted for provision to emergency services as required. If the current access point identifier does not match any of the home access point identifiers and none of the home access point identifiers are set to the default value, service is denied.

If the current access point identifier does not match any of the home access point identifiers and one or more of the home access point identifiers is set to the default value, the handset authorization component can provide the handset with a list of valid physical addresses. The subscriber can select one of the provided physical addresses and respond with an access point initialization message identifying the selected physical address and providing the associated access point identifier. The subscriber profile can be updated and the home access point identifier associated with the selected physical address is set to the provided access point identifier. The handset can maintain an access point profile for each access point associated with the handset and connect to dual mode service through any of the associated access points. The identifier for the current access point can be used to select the appropriate physical address to provide for E911 purposes.

Referring to FIGS. 6-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
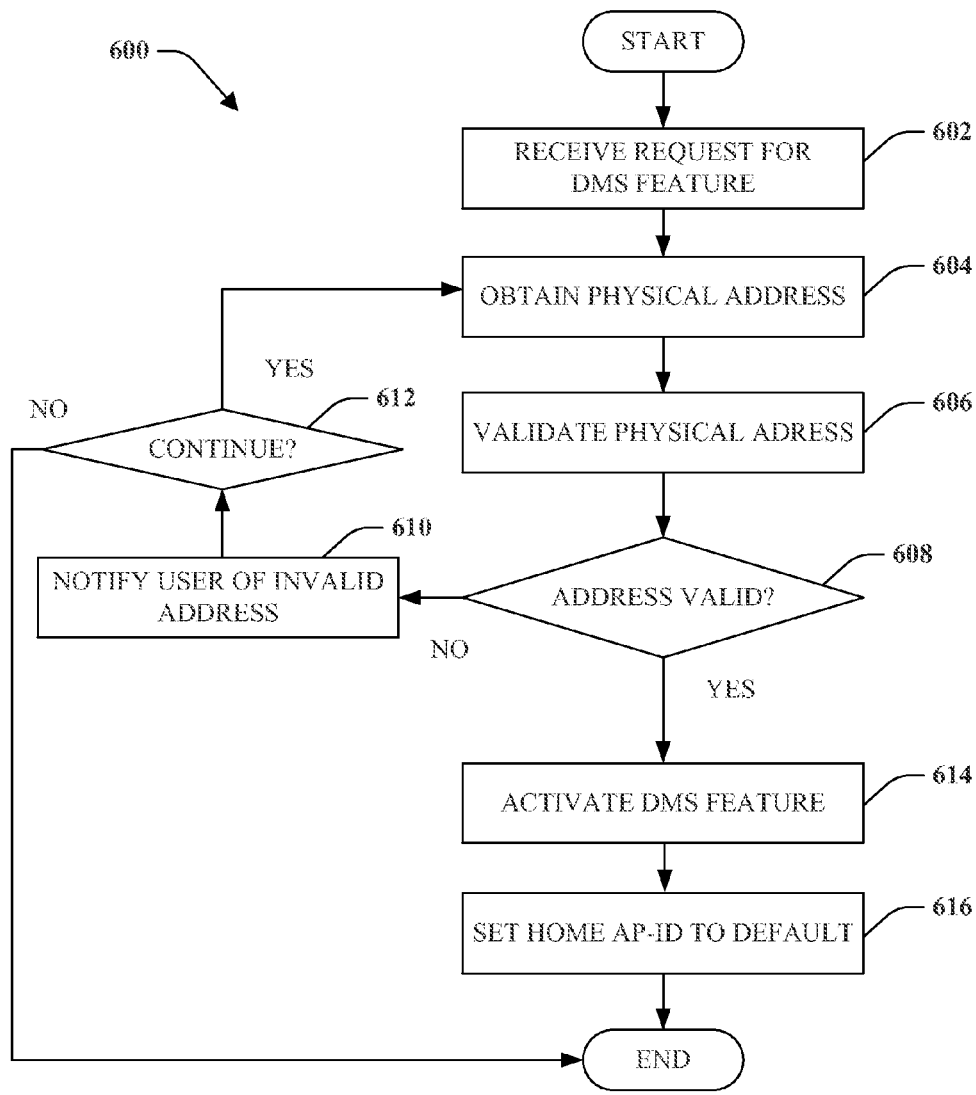
FIG. 6 is a representative flow diagram illustrating a methodology for activating dual mode service for a subscriber account.

Turning specifically to FIG. 6, a methodology 600 for activating or subscribing to dual mode service is illustrated. At reference numeral 602, a request for dual mode service is received. The request can be received in writing, via a telephone communication, a website or any other means for communicating with the dual mode service. Physical or geographical address or location information for the subscriber account is received at reference numeral 604. The physical address can be included in the initial request for service, provided separately or in response to a prompt from the dual mode service.

At reference numeral 606, the address information is validated. Validation can include geocoding the physical address to calculate corresponding latitude and longitude coordinates and determining which PSAP, if any, can provide service for the physical address location. If no PSAP provides coverage, a dual mode service provider may be unable to fulfill the necessary E911 requirements and the physical address can be invalidated for purposes of dual mode service. The provided physical address can also be validated with respect to actual street addresses utilizing a MSAG. The physical address can be converted into the appropriate format for use with the MSAG and it can be determined whether there is a valid street address that corresponds to the physical address. Finally, validation can include a cross check based upon billing records or available public property records to ensure that the subscriber provided physical address corresponds to the subscriber. The subscriber can be prompted to confirm that a seemingly unrelated location is the desired address to be utilized for emergency services.

After validation, a determination is made as to whether the provided physical address information has been validated at reference numeral 608. If the address is invalid, a message notifying the subscriber of a possible problem and requesting new physical address information can be generated at reference numeral 610. At reference numeral 612, a determination is made as to whether to continue the subscription process. If yes, new physical address information is obtained at 604. If no, the process terminates.

If the physical address information has been determined to be valid, dual mode service is activated at reference numeral 614. Activation can include updating subscriber records for the subscriber account to indicate the election of dual mode service. In addition, the provided physical address can be stored for later retrieval for E911 services and the like. At reference numeral 616, the home access point identifier is set to a default value. The default value can be a constant (e.g., all 1s). Alternatively, an individualized default value can be generated for each subscriber. The default value can be generated based on subscriber identity. For example, the default value can be a function of the Mobile Subscriber ISDN Number (MSISDN) (e.g., the telephone number) or the International Mobile Subscriber Identity (ISMSI) for the subscriber account. Generating individual default values can enhance security for the dual mode service system. In order to manipulate the individual default values, an unauthorized individual would have to determine the algorithm for generating the default values, rather than simply deducing the single default value.

Figure 7:
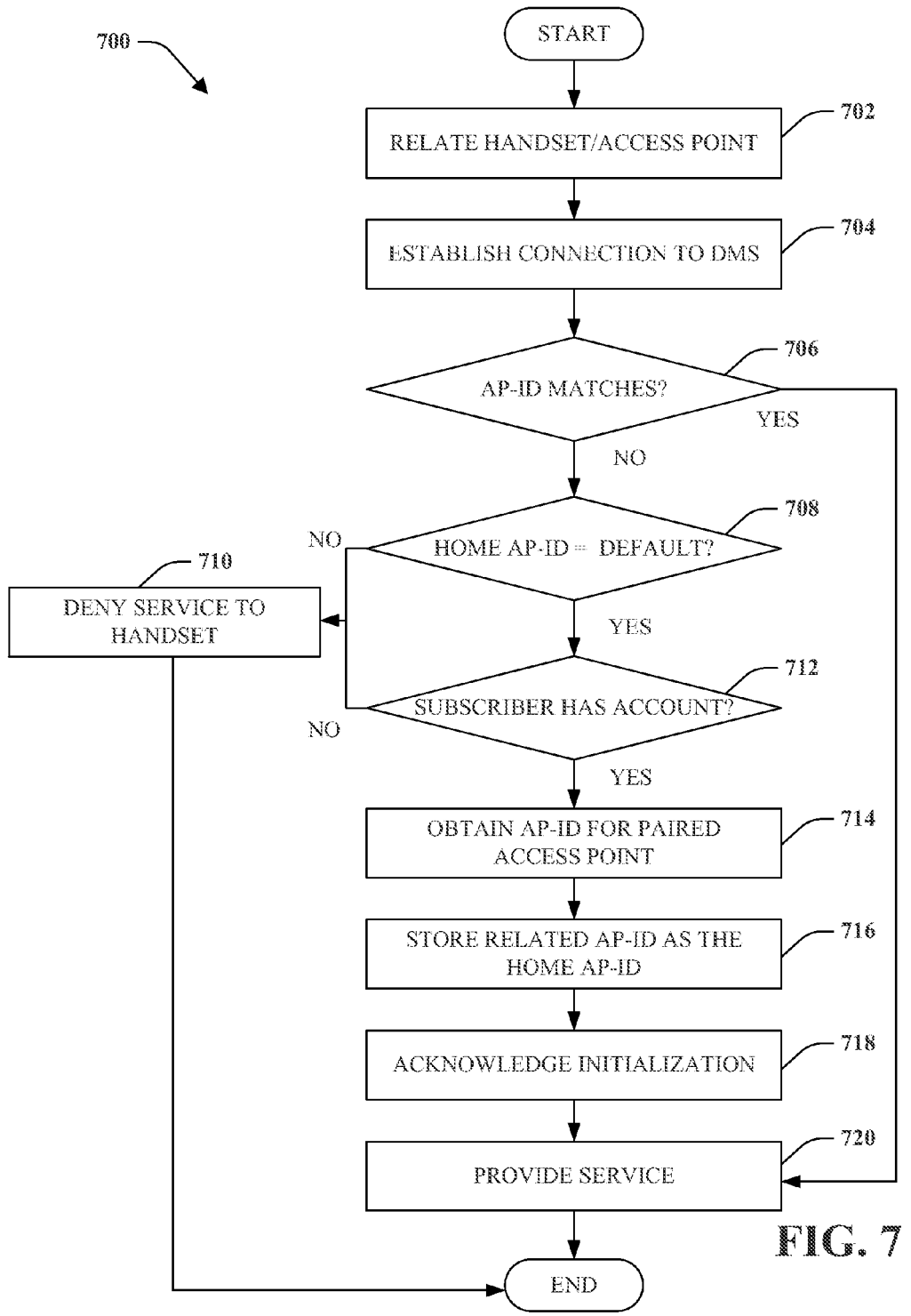
FIG. 7 is a representative flow diagram illustrating a methodology for initializing dual mode service for a subscriber account.

Referring now to FIG. 7, a methodology 700 for initializing a dual mode service handset is illustrated. At reference numeral 702, a handset is related to or paired with an access point. The relating or pairing process is described in detail with respect to FIG. 8, below. During pairing, the access point identifier is obtained for the access point with which the handset is related. At reference numeral 704, a connection is established between the handset and the dual mode service system. Establishing a connection can include initiating an IEEE 802.11 link between the handset and the access point and initiating IKE authentication with the dual mode service system.

Once the connection is established, the access point identifier for the access point currently providing connection services to the handset, referred to herein as the current access point, can be compared to the home access point identifier maintained by the dual mode service system. At reference numeral 706, a determination is made as to whether the current access point matches the home access point identifier maintained by the dual mode service system. If yes, the handset has already been initialized to the current access point and the process continues to reference numeral 720, where the subscriber handset is provided dual mode service. If no, at reference numeral 708, a determination is made as to whether the home access point identifier is equal to the appropriate default value, whether a constant or an individualized default value. If the home access point is not set to the default value, service is denied at reference numeral 710, since it has already been determined that the current access point does not match the home access point identifier. If the home access point identifier is set to the default value, a determination is made as to whether the subscriber has a valid account with the dual mode service system at reference numeral 712. This can include determining if the subscriber has elected dual mode services as well as determining if the subscriber has a valid wireless account. If no, service is denied at reference numeral 710. If yes, an access point initialization message (e.g. a USSD message) can be received including the related access point identifier for the handset at reference numeral 714.

The related access point identifier can be stored as the home access point identifier at reference numeral 716. At reference numeral 718, an acknowledgement can be sent to notify the subscriber of the successful initialization of the handset. The subscriber handset can be provided with service at reference numeral 720.

Figure 8:
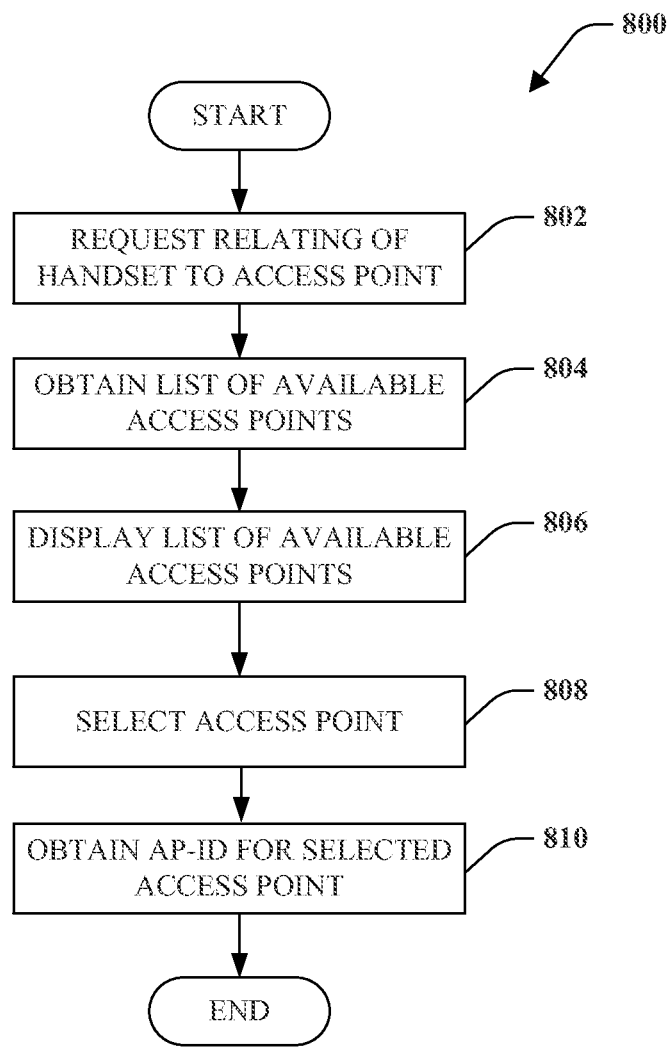
FIG. 8 is a representative flow diagram illustrating a methodology for relating a handset to an access point during initialization of dual mode service for a subscriber account.

Turning now to FIG. 8, a methodology 800 for pairing or relating a handset with an access point is illustrated. At reference numeral 802, a request to initiate pairing or relating is received. The request can be initiated by a subscriber when the handset is in proximity to the access point that the subscriber wishes to designate as the home access point. At reference numeral 804, a list of available access points is obtained. The list can include all access points within the vicinity of the handset that the handset is capable of perceiving. Each access point can broadcast information (e.g., an SSID) used to generate the list of possible access points. Once the list is obtained, the list can be displayed to a subscriber at reference numeral 806. Each access point can be represented by the SSID. A particular access point is selected from the list of access points at reference numeral 808. The particular access point identifier (e.g., MAC-ID) can be obtained at reference numeral 810 in preparation for initialization as described with respect to FIG. 7.

Figure 9:
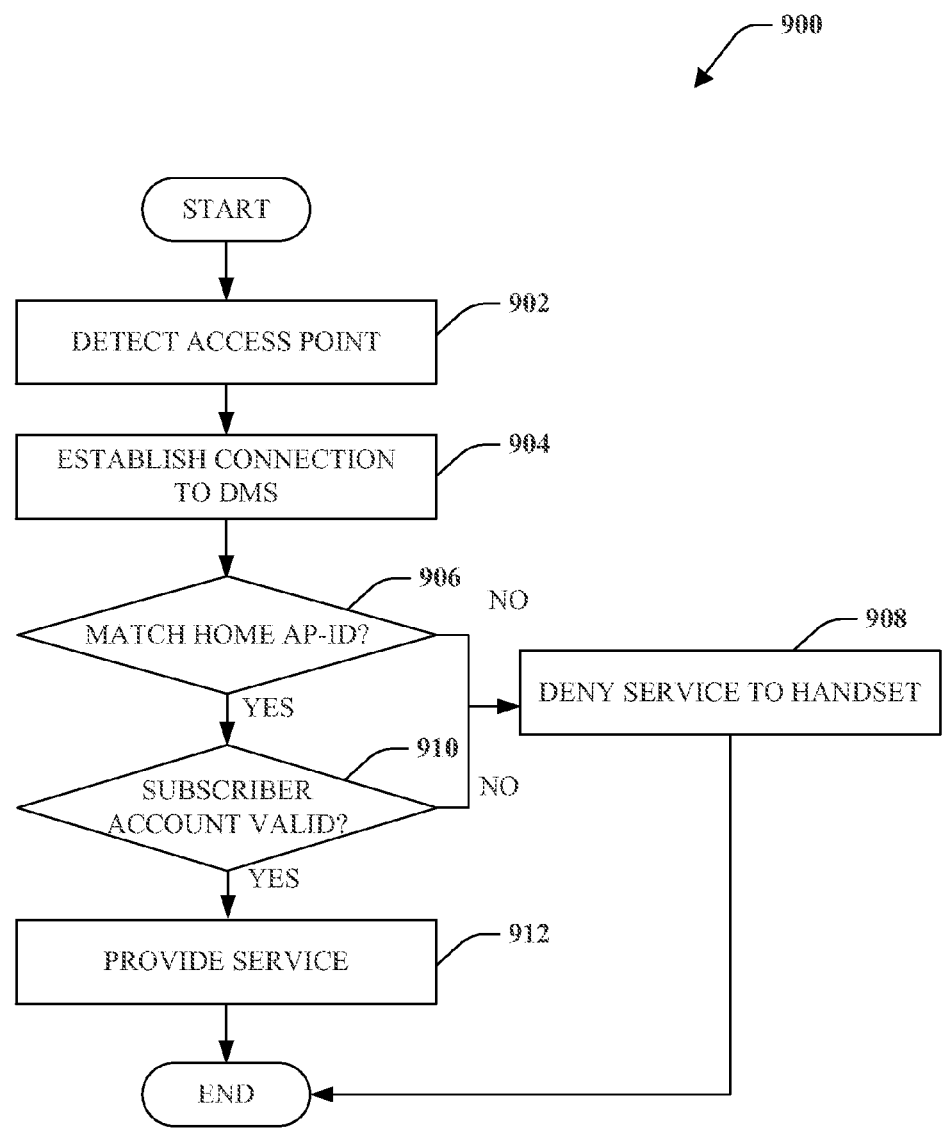
FIG. 9 is a representative flow diagram illustrating a methodology for accessing dual mode service.

Referring now to FIG. 9, a methodology 900 for utilizing a dual mode handset with VoIP communication is illustrated. At reference numeral 902, the home access point for the handset is detected. A connection is established to the dual mode service system at 904. A determination is made as to whether the access point identifier for the access point providing the connection matches the home access point identifier maintained by the dual mode service system at reference numeral 906. If the access point identifiers do not match, the subscriber handset is denied service at reference numeral 908 and the process terminates. If the access point identifiers match, indicating that the handset is connecting through the access point with which it is related, a determination is made as to whether the subscriber account is in good order at reference numeral 910. If no, service is denied at reference numeral 908. If yes, the subscriber handset is provided service at reference numeral 912. It is important to note that a valid physical address must have been provided prior to the request for service. If a valid physical address has not been provided, the subscriber profile will indicate that the subscriber does not have dual mode service. Consequently, service E911 requirements have to have been met before service can be provided.

Figure 10:
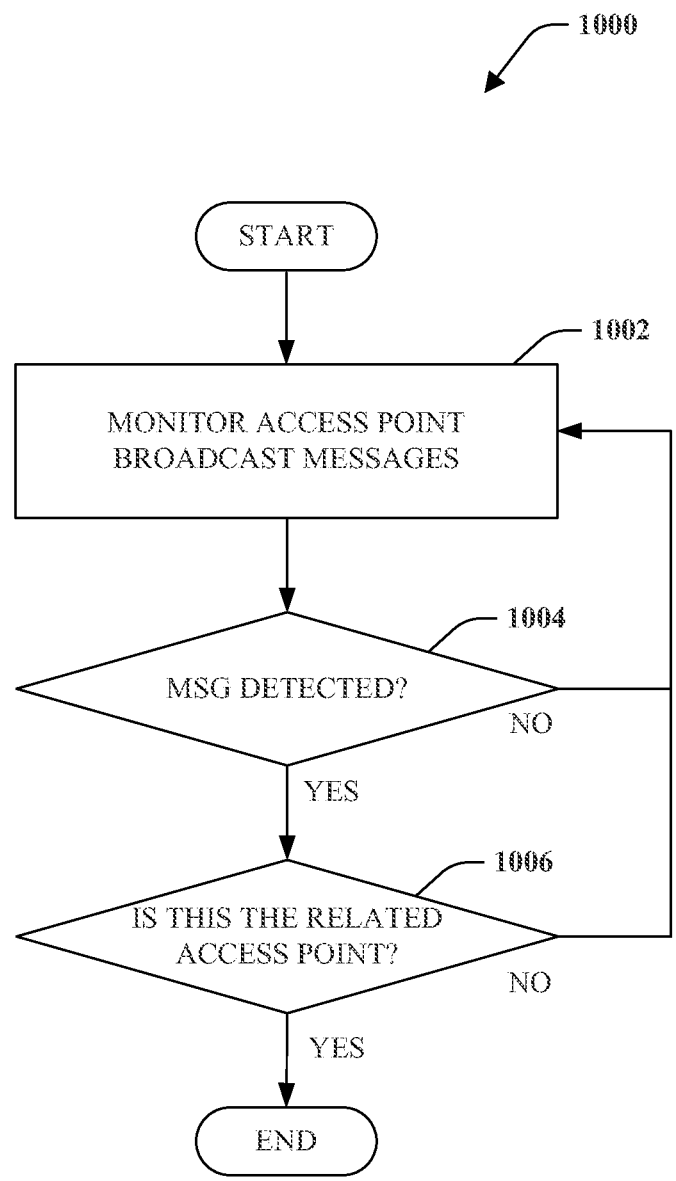
FIG. 10 is a representative flow diagram illustrating a methodology for detecting the selected access point for a subscriber account.

Turning now to FIG. 10, a methodology 1000 for detecting the access point is illustrated. At reference numeral 1002, access point broadcast messages are monitored. A determination is made as to whether a broadcast message is detected at reference numeral 1004. If a message has not been detected, monitoring of broadcast messages continues at reference numeral 1002. If a message is detected, at reference numeral 1002, a determination can be made at reference numeral 1006 as to whether the access point that transmitted the broadcast message is the access point to which the dual mode handset has been restricted. Information in the broadcast message (e.g., the SSID) can be compared to information in an access point profile maintained at the handset to determine if the access point is the access point to which the handset has been related or restricted. If the access point is not the related access point, monitoring of broadcast messages continues at reference numeral 1002. If the access point is the home or related access point, the handset can proceed to connect to the access point as discussed in detail above with respect to FIG. 9.

Figure 11:
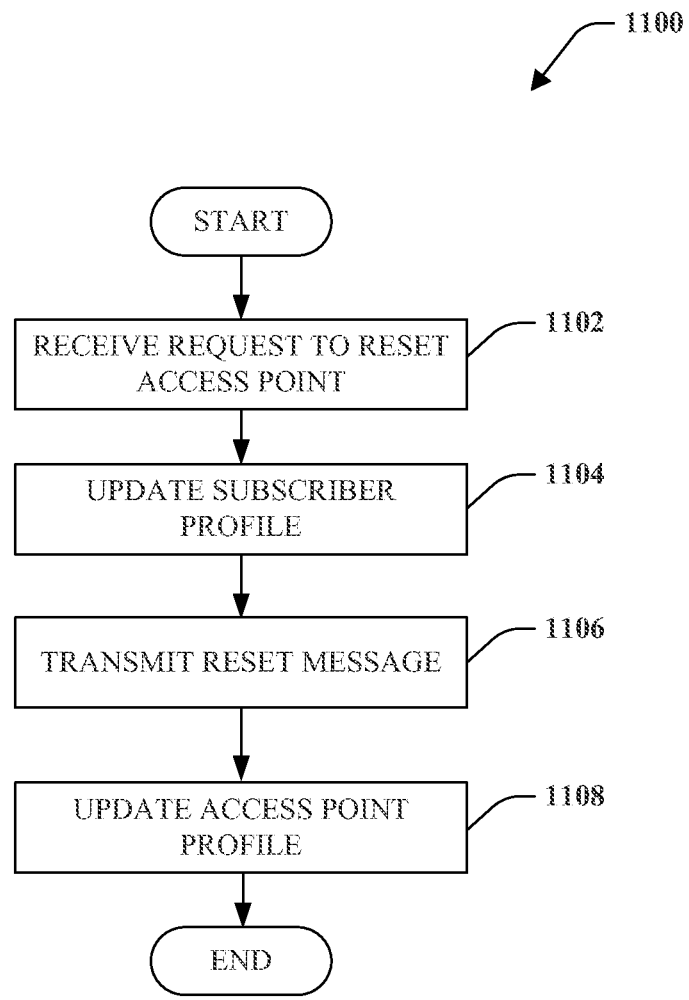
FIG. 11 is a representative flow diagram illustrating a methodology for resetting an access point for a dual mode handset.

Referring now to FIG. 11, a methodology 1100 for resetting an access point related to a handset is illustrated. At reference numeral 1102, a request to reset the access point associated with a handset is received. The request can include information identifying the subscriber account and associated handset. Once a request has been received, the subscriber profile for the subscriber specified in the request can be retrieved and updated at reference numeral 1104.

During the update, the home access point identifier can be reset to the appropriate default value. In addition, if the subscriber has indicated that they wish to discontinue dual mode service, the feature can be turned off in the subscriber profile. At reference numeral 1106, a reset or discontinuation message can be transmitted to notify the handset of the change in dual mode service. The access point profile can be updated in response to the reset message at reference numeral 1108. The access point profile can be cleared or reset.

Figure 12:
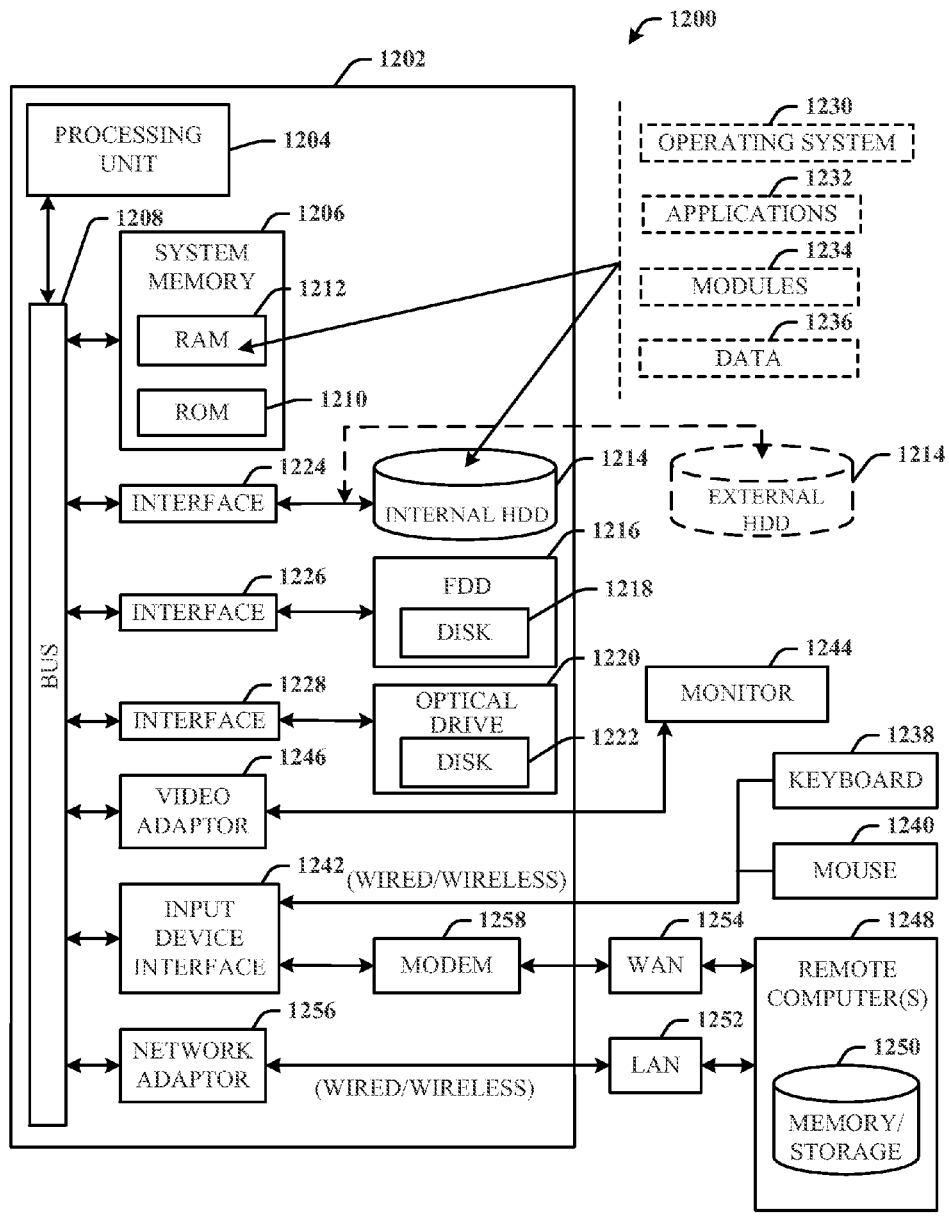
FIG. 12 is an exemplary computing environment that can be employed in connection with various aspects described herein.

Referring now to FIG. 12, there is illustrated a block diagram of a computer operable to aid in provisioning of dual mode services as described above. In order to provide additional context for various aspects of the claimed subject matter, FIG. 12 and the following discussion are intended to provide a brief, general description of a suitable computing environment 1200 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
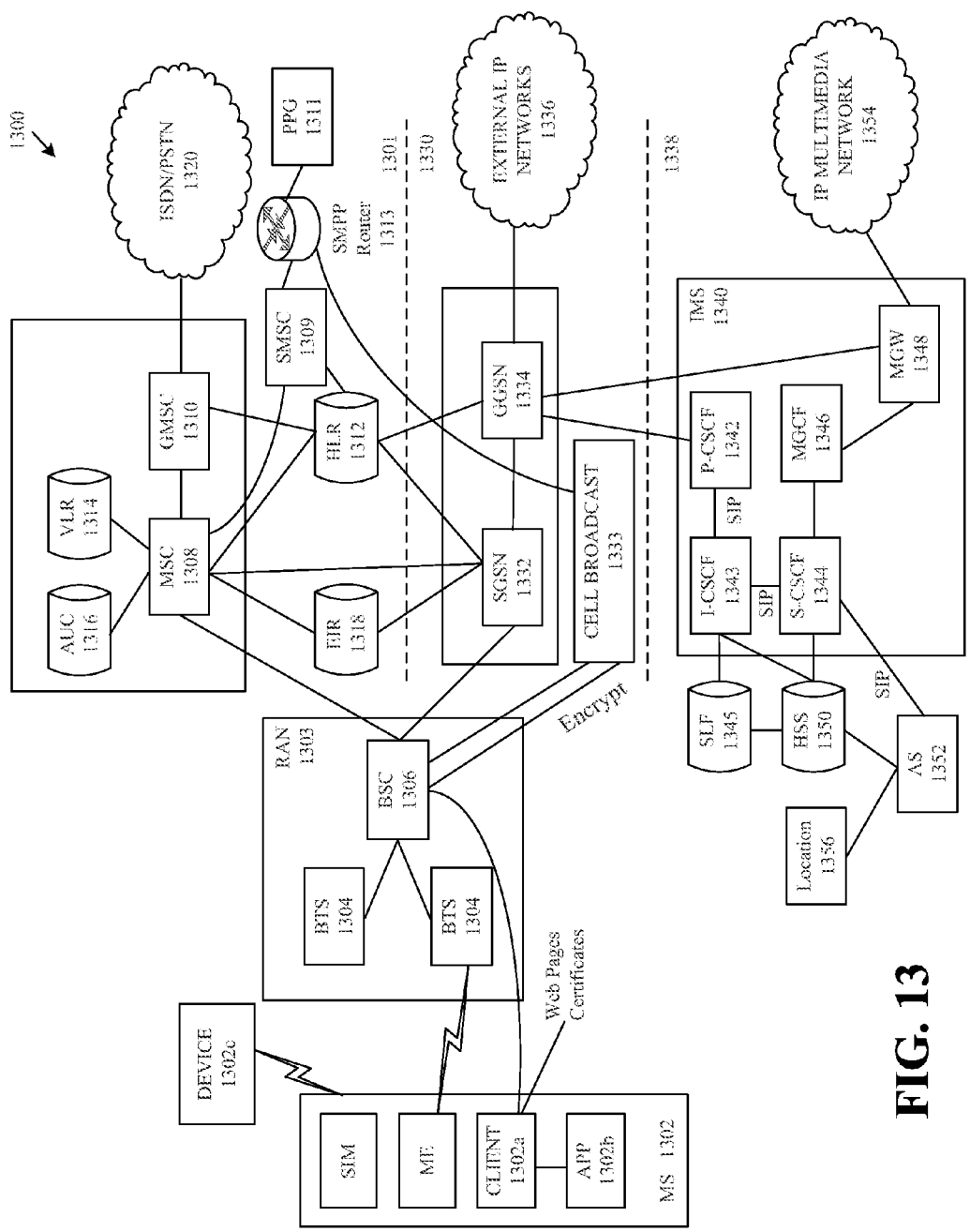
FIG. 13 is an exemplary networking environment.

Now turning to FIG. 13, such figure depicts a GSM/GPRS/IP multimedia network architecture 1300 that includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1302 includes an embedded client 1302a that receives and processes messages received by the MS 1302. The embedded client 1302a may be implemented in JAVA and is discuss more fully below.

The embedded client 1302a communicates with an application 1302b that provides services and/or information to an end user. One example of the application may be navigation software that provides near real-time traffic information that is received via the embedded client 1302a to the end user. The navigation software may provide road conditions, suggest alternate routes, etc. based on the location of the MS 1302. Those of ordinary skill in the art understand that there are many different methods and systems of locating an MS 1302.

Alternatively, the MS 1302 and a device 1302c may be enabled to communicate via a short-range wireless communication link, such as BLUETOOTH. For example, a BLUETOOTH SIM Access Profile may be provided in an automobile (e.g., device 1302c) that communicates with the SIM in the MS 1302 to enable the automobile's communications system to pull information from the MS 1302. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1302c. There may be an endless number of devices 1302c that use the SIM within the MS 1302 to provide services, information, data, audio, video, etc. to end users.

The BTS 1304 is physical equipment, such as a radio tower, that enables a radio interface to communicate with the MS. Each BTS may serve more than one MS. The BSC 1306 manages radio resources, including the BTS. The BSC may be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1316, and an Equipment Identity Register (EIR) 1318. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. In other words, the GMSC 1310 provides interworking functionality with external networks.

The HLR 1312 is a database or component(s) that comprises administrative information regarding each subscriber registered in a corresponding GSM network. The HLR 1312 also includes the current location of each MS. The VLR 1314 is a database or component(s) that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (e.g., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations and security functions and access controls.

A Cell Broadcast Center (CBC) 1333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 may be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 may also modify an outgoing request according to a set of rules defined by the network operator (for example, address analysis and potential modification).

The I-CSCF 1343 forms an entrance to a home network and hides the inner topology of the home network from other networks and provides flexibility for selecting an S-CSCF. The I-CSCF 1343 may contact a subscriber location function (SLF) 1345 to determine which HSS 1350 to use for the particular subscriber, if multiple HSSs 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with other IP multimedia networks 1354.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      receiving, from a mobile device, a request for a dual mode service of a wireless provider device, the request comprising a geographical address associated with a home access point device with which the mobile device is to be paired;
      associating the geographical address, a dual mode service election indicator, and a default home access point device identifier with a user account for the mobile device in response to the receiving;
      receiving a home access point device identifier from the mobile device via the home access point device, wherein the home access point device identifier identifies the home access point device; and
      activating the dual mode service for the mobile device in response to the receiving the home access point device identifier and based on presence of the geographical address, the dual mode service election indicator, and the default home access point device identifier with the user account.

2. The system of claim 1, wherein the activating comprises replacing the default home access point device identifier with the home access point device identifier in the user account.

3. The system of claim 1, wherein the operations further comprise:
   authorizing provision of the dual mode service by the wireless provider device to the mobile device based on a determination that the mobile device is connected to the system via the access point device.

4. The system of claim 1, wherein the operations further comprise:
   denying provision of the dual mode service by the wireless provider device to the mobile device based on a determination that the mobile device is connected to the system via the access point device.

5. The system of claim 1, wherein the operations further comprise:
   determining that the geographical address is valid, and wherein the associating the geographical address with the user account is responsive to the geographical address being determined to be valid.

6. The system of claim 5, wherein the determining that the geographical address is valid is based on an availability of an emergency service for the geographical address.

7. The system of claim 5, wherein the determining that the geographical address is valid is based on a street address of a billing record determined to correspond to the geographical address.

8. The system of claim 1, wherein the operations further comprise:
   establishing a secure internet protocol tunnel from the mobile device via the home access point device for transmittal of the home access point device identifier based on a determination that the default value is present.

9. The system of claim 1, wherein the operations further comprise:
   receiving a reset request to reset the home access point device identifier; and
   replacing the home access point device identifier with the default value in response to the receiving the reset request.

10. A method, comprising:
    receiving, by a system comprising a processor, an activation request from a mobile device for activation of a dual mode service of a wireless provider device in association with a user account for the mobile device, the request comprising a geographical address associated with a home access point device with which the mobile device is to be paired;
    associating, by the system, the geographical address, a dual mode service election indicator, and a default home access point device identifier with the user account in response to the receiving the activation request;

receiving, by the system, a home access point device identifier from the mobile device via the home access point device, wherein the home access point device identifier identifies the home access point device; and activating the dual mode service, including replacing, by the system, the default home access point device identifier with the home access point device identifier in the user account.

11. The method of claim 10, further comprising:

receiving, by the system, a request from the mobile device for the dual mode service; and authorizing, by the system, provision of the dual mode service by the wireless provider device to the mobile device based on a determination that the home access point device identifier is included in the request.

12. The method of claim 10, further comprising:

receiving, by the system, a request from the mobile device for the dual mode service; and denying, by the system, provision of the dual mode service by the wireless provider device to the mobile device based on a determination that the home access point device identifier is not included in the request.

13. The method of claim 10, wherein the replacing is based on presence of the geographical address, the dual mode service election indicator, and the default home access point device identifier with the user account.

14. The method of claim 10, further comprising:

determining, by the system, that the geographical address is valid based on an availability of an emergency service for the geographical address, wherein the associating the geographical address with the user account is responsive to the geographical address being determined to be valid.

15. The method of claim 10, further comprising:

establishing, by the system, a secure internet protocol tunnel from the mobile device via the home access point device for transmittal of the home access point device identifier based on a determination that the default value is present.

16. The method of claim 10, further comprising:

receiving, by the system, a reset request to reset the home access point device identifier; and replacing, by the system, the home access point device identifier with the default value in response to the receiving the reset request.

17. A non-transitory machine-readable medium, comprising executable instructions that, when executed by a processor, facilitate performance of operations, comprising:

receiving, from a mobile device, a request for a dual mode service of a wireless provider device, wherein the request comprises a geographic address associated with a home access point device with which the mobile device is to be paired;

associating the geographic address, a dual mode service election indicator, and a default home access point device identifier with a user identity associated with the mobile device in response to the receiving;

receiving a home access point device identifier from the mobile device via the home access point device, wherein the home access point device identifier identifies the home access point device; and facilitating activation of the dual mode service for the mobile device in response to the receiving the home access point device identifier and based on the geographic address, the dual mode service election indicator, and the default home access point device identifier.

18. The non-transitory machine-readable medium of claim 17, wherein the facilitating the activation comprises facilitating a replacement of the default home access point device identifier associated with the user identity with the home access point device identifier.

19. The non-transitory machine-readable medium of claim 17, wherein the operations further comprise:

determining that the geographic address is valid, and wherein the associating the geographic address with the user identity is responsive to the geographic address being determined to be valid.

20. The non-transitory machine-readable medium of claim 19, wherein the determining that the geographic address is valid is based on a street address of a billing record determined to correspond to the geographic address.

* * * * *